J. BIJUR.
ALTERNATING CURRENT SYSTEM OF DISTRIBUTION, REGULATION, AND CONTROL.
APPLICATION FILED MAR. 29, 1906.

983,670.

Patented Feb. 7, 1911.

10 SHEETS—SHEET 1.

Attest:

Inventor:
Joseph Bijur
by Dickerson, Brown, Raegener & Binney
Attys

J. BIJUR.
ALTERNATING CURRENT SYSTEM OF DISTRIBUTION, REGULATION, AND CONTROL.
APPLICATION FILED MAR. 29, 1906.

983,670.

Patented Feb. 7, 1911.

10 SHEETS—SHEET 2.

Attest:

Inventor:
Joseph Bijur
by Dickerson, Brown, Raegener & Binney
Attys

J. BIJUR.
ALTERNATING CURRENT SYSTEM OF DISTRIBUTION, REGULATION, AND CONTROL.
APPLICATION FILED MAR. 29, 1906.

983,670.

Patented Feb. 7, 1911.

10 SHEETS—SHEET 7.

Attest:

Inventor:
Joseph Bijur
by Dickerson, Brown, Raegener & Binney
Attys

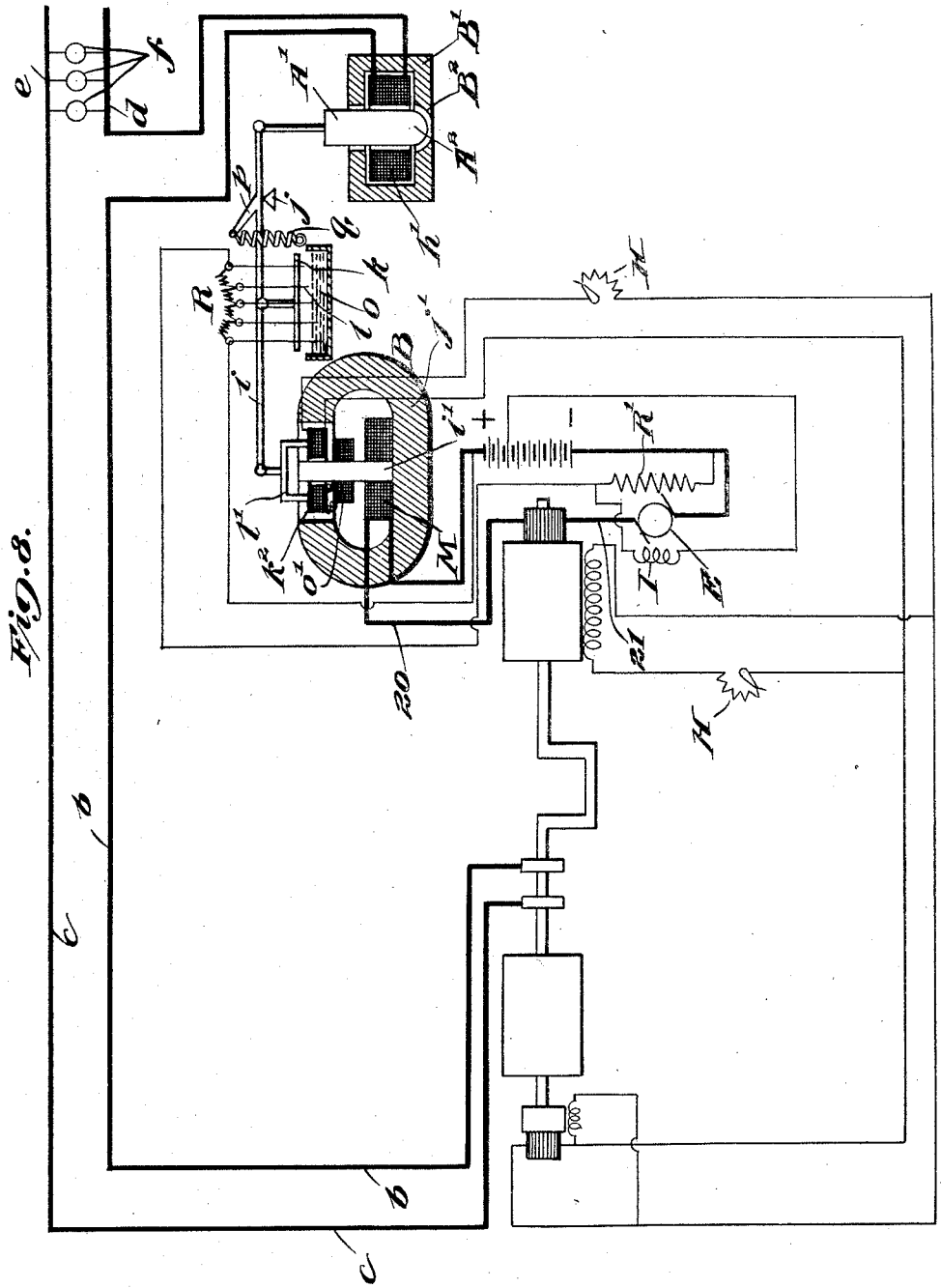

J. BIJUR.
ALTERNATING CURRENT SYSTEM OF DISTRIBUTION, REGULATION, AND CONTROL.
APPLICATION FILED MAR. 29, 1906.
983,670.
Patented Feb. 7, 1911.
10 SHEETS—SHEET 9.
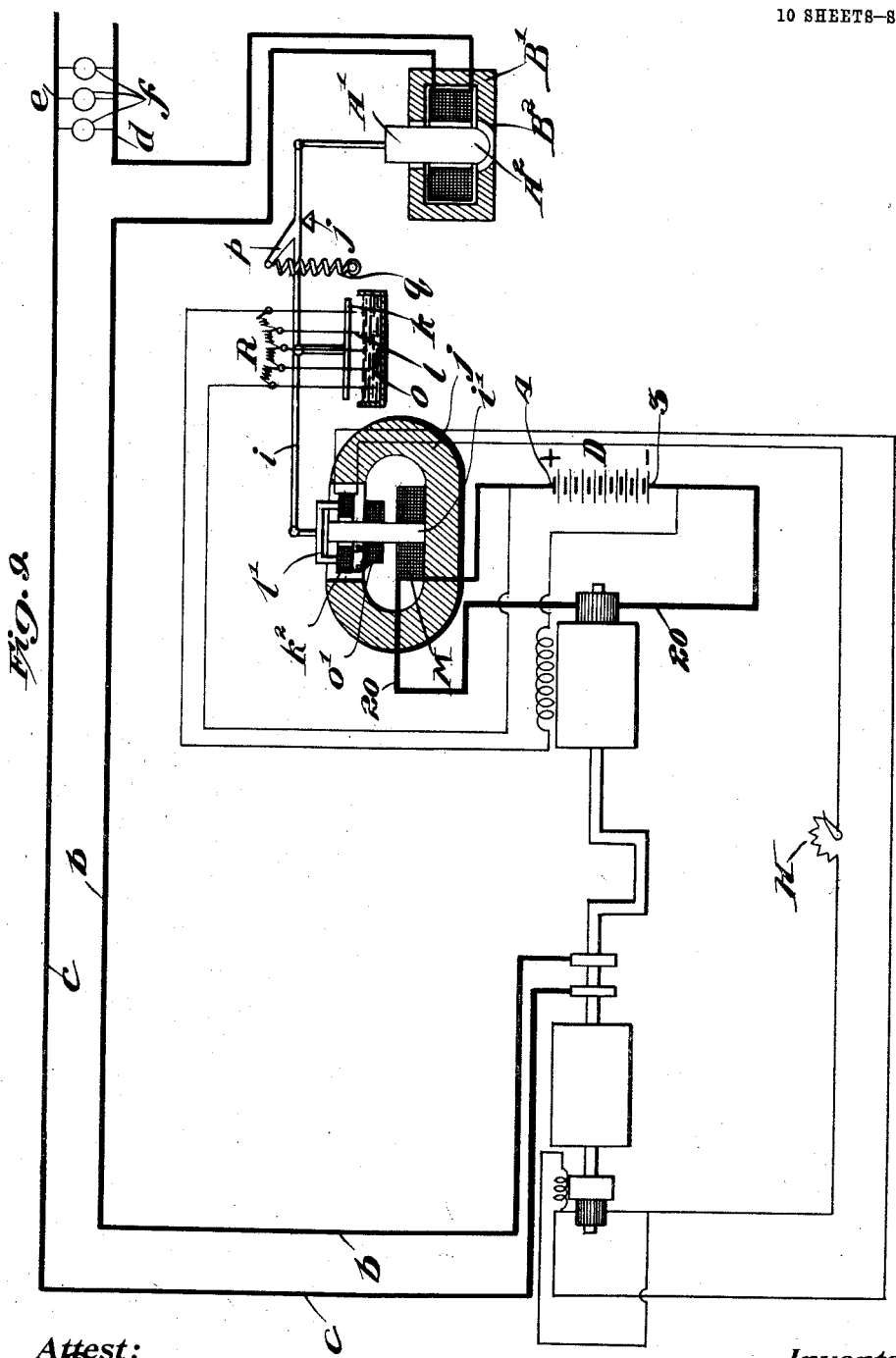

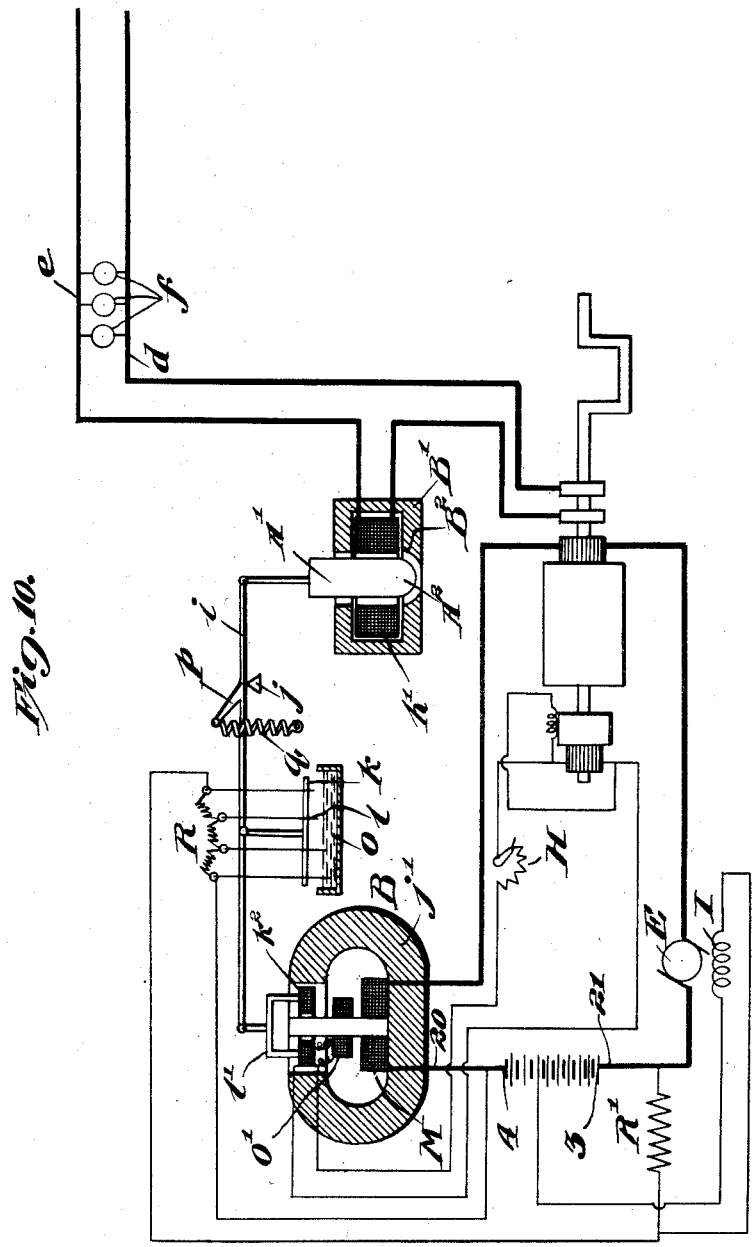

UNITED STATES PATENT OFFICE.

JOSEPH BIJUR, OF NEW YORK, N. Y., ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

ALTERNATING-CURRENT SYSTEM OF DISTRIBUTION, REGULATION, AND CONTROL.

983,670. Specification of Letters Patent. Patented Feb. 7, 1911.

Application filed March 29, 1906. Serial No. 308,691.

*To all whom it may concern:*

Be it known that I, JOSEPH BIJUR, a citizen of the United States, and resident of the borough of Manhattan, city, county, and State of New York, have invented certain new and useful Improvements in Alternating-Current Systems of Distribution, Regulation, and Control, of which the following is a specification accompanied by drawings.

This invention relates to alternating current systems of distribution, regulation and control wherein a storage battery is utilized to compensate for variations in the load, and the objects of the invention are to improve upon such systems and increase their efficiency.

Further objects of the invention will hereinafter appear, and to these ends the invention consists of circuits and apparatus for carrying out the above objects embodying the features of construction, combinations of elements and arrangement of parts having the general mode of operation substantially as hereinafter fully described and claimed in this specification and shown in the accompanying drawings, in which—

Figure 1:
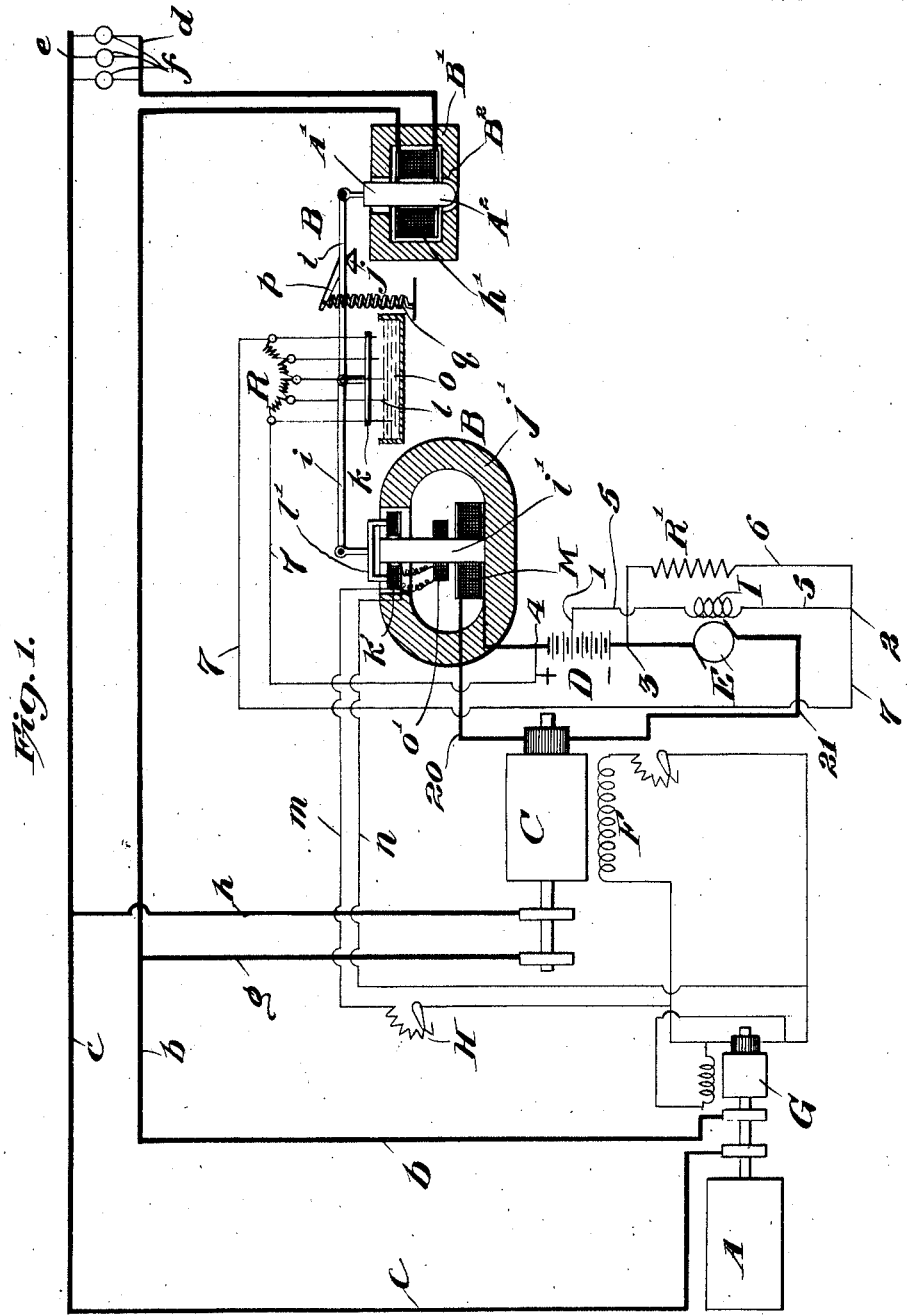
Figure 2:
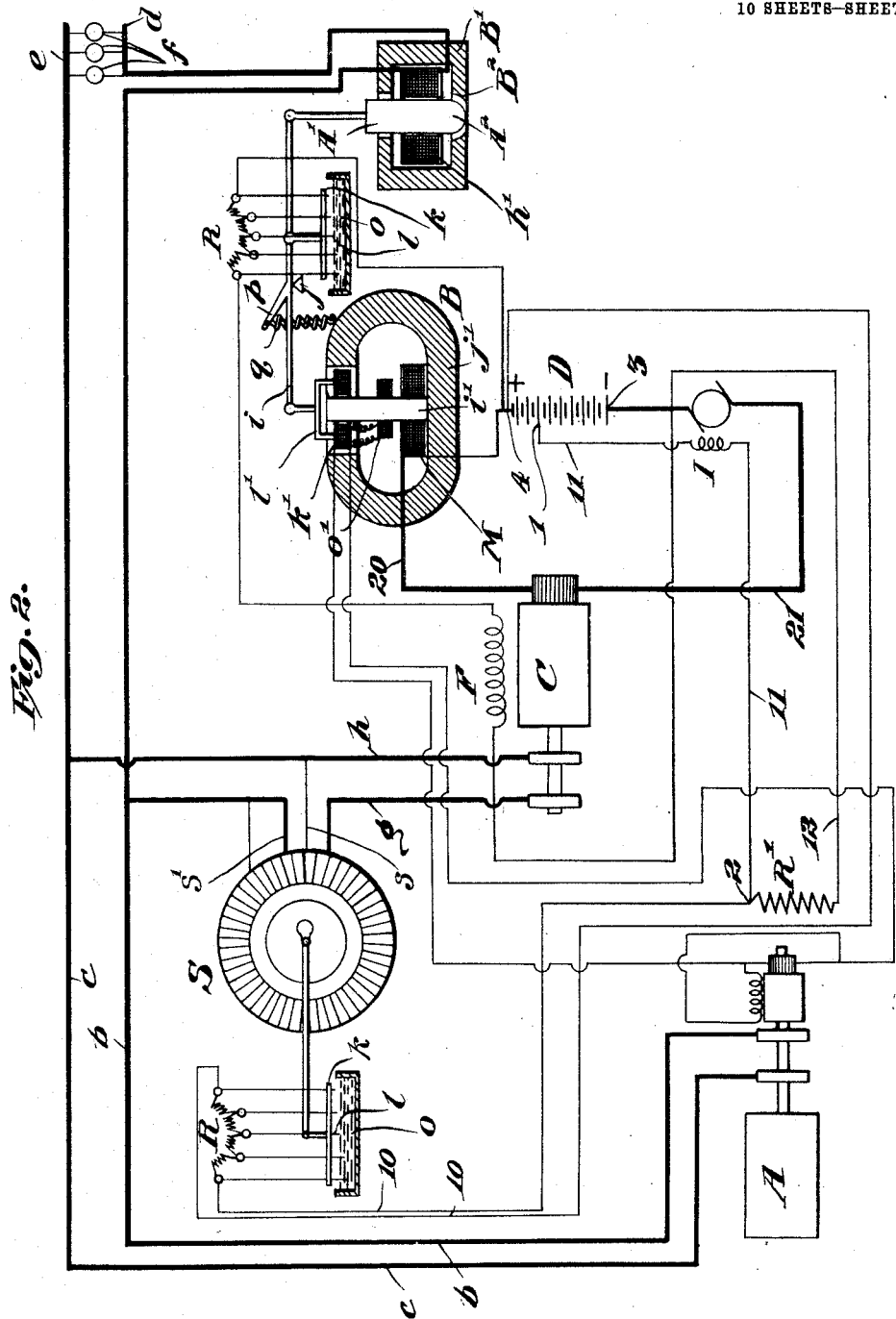
Figure 3:
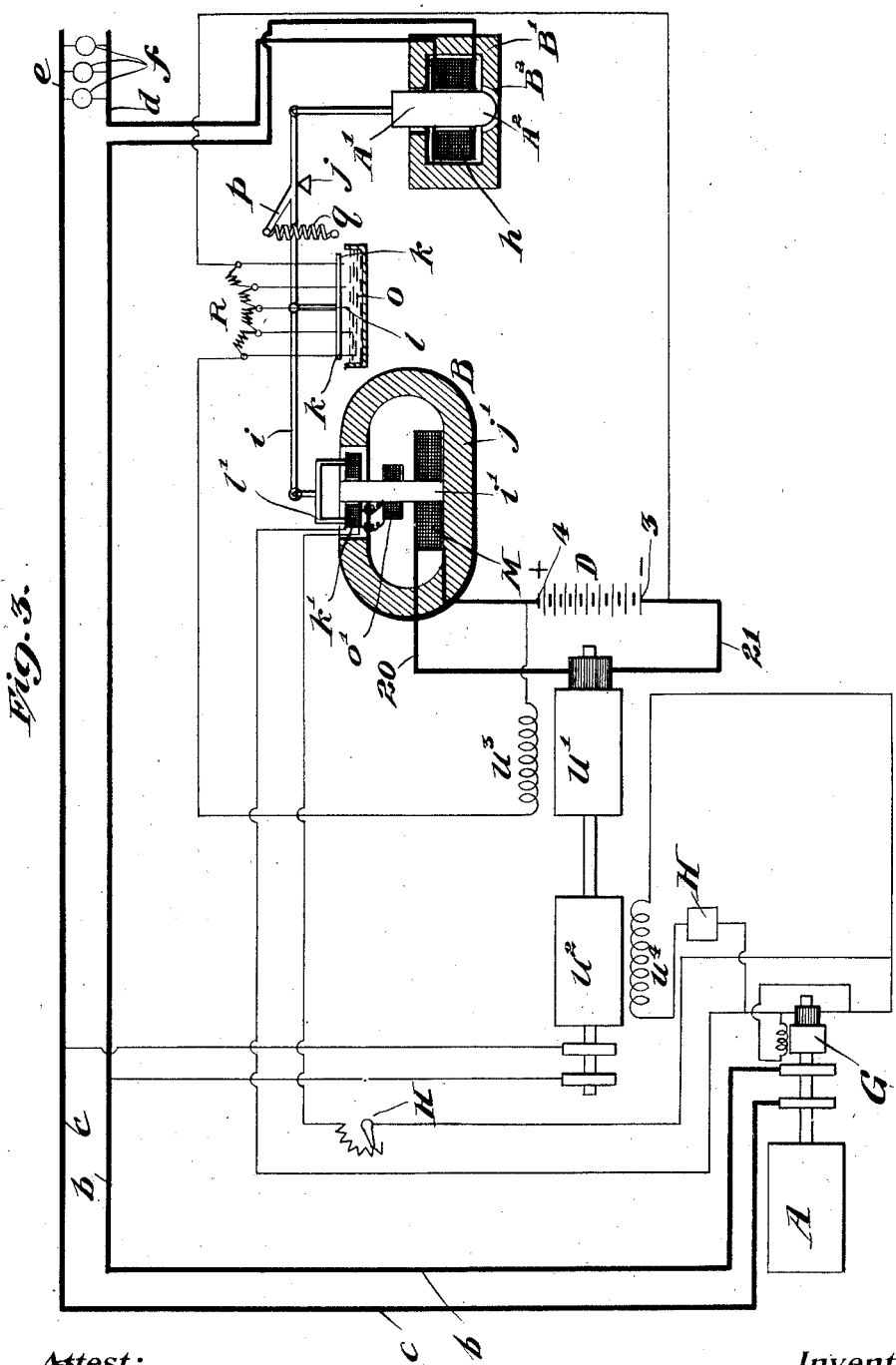
Figure 4:
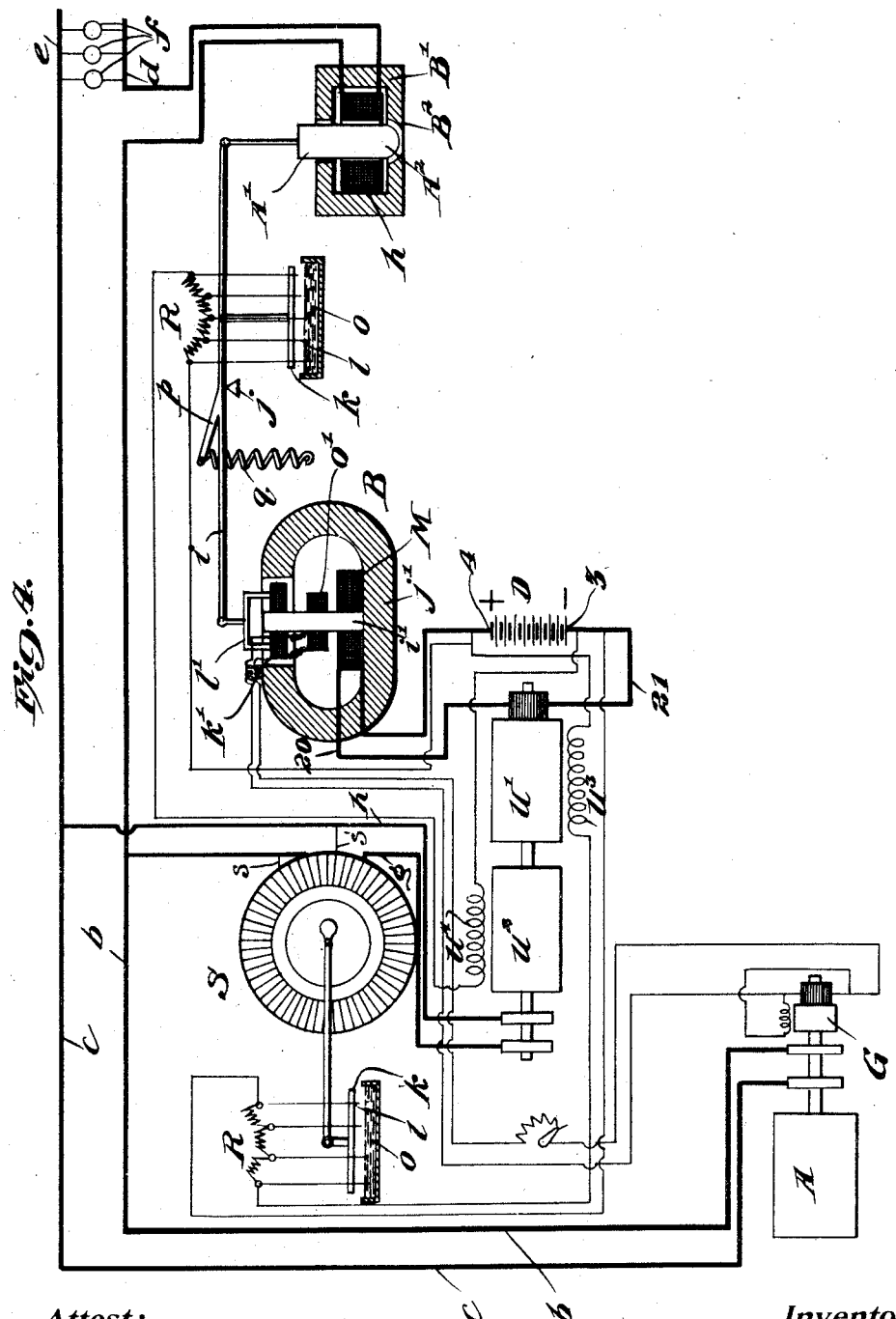
Figure 5:
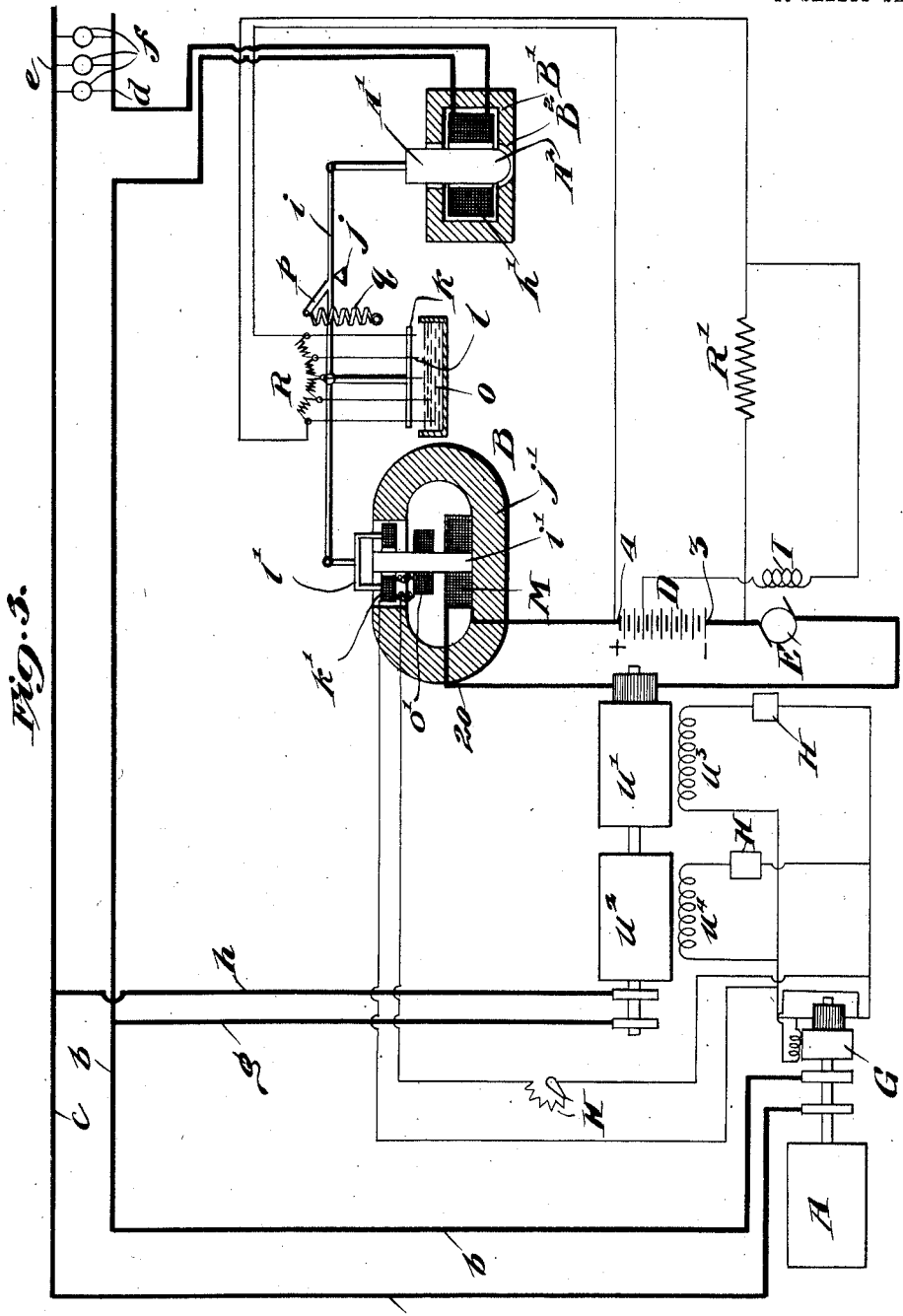
Figure 6:
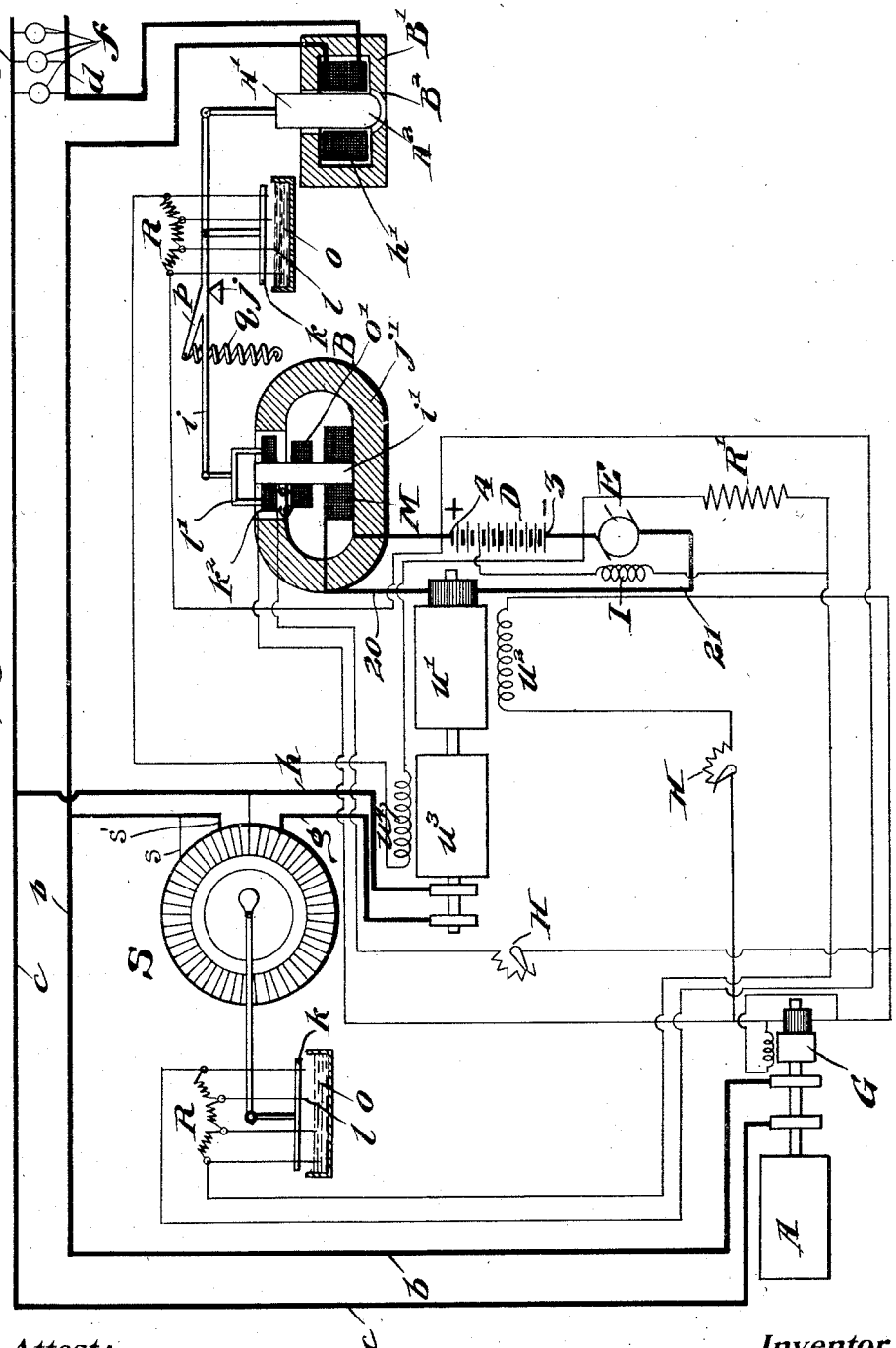
Figure 7:
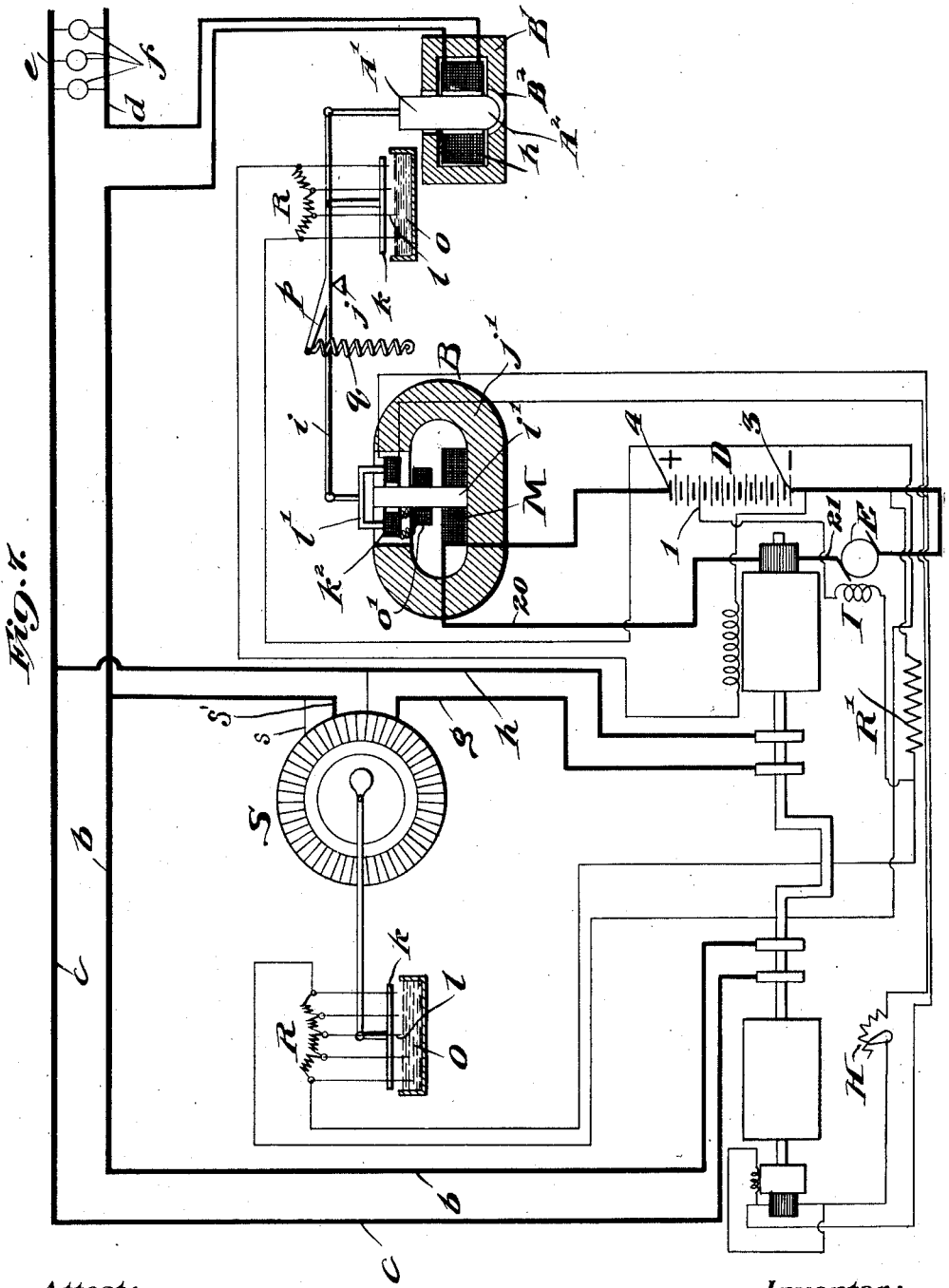

Figure 1 is a diagram of circuits and apparatus for carrying out the invention; Fig. 2 is a modification of the same; Fig. 3 is a diagram of circuits and apparatus for carrying out the invention; Fig. 4 is a modification of the same; Fig. 5 is a diagram of circuits and apparatus for carrying out the invention; Fig. 6 is a modification of the same; Fig. 7 is a diagram of circuits and apparatus for carrying out the invention; Figs. 8, 9 and 10 are diagrams of modifications.

Referring to the drawings, A represents a source of supply, in this instance an alternating current generator connected to the mains $b$ and $c$, while the work portion of the system carrying the external load is represented by the mains $d$ and $e$, and in this instance the load is represented by the lamps $f$ by way of illustration.

B represents regulating means or a regulator suitably connected in circuit, in this instance connected in the main $d$ of the work circuit, in which the current varies in accordance with the load.

A rotary converter C has its alternating current side connected across the mains $b$ and $c$ by the leads $g$ and $h$. A storage battery D and a booster E are connected in series with each other, to the direct current side of the rotary converter C by the wires 20 and 21. These wires 20 and 21 also include the magnet M of the regulating means. The field F of the rotary converter is preferably connected to some suitable source of constant potential, as, for instance, an exciter G shown on the shaft of the main generator A, and a hand rheostat H may be provided in the circuit of the field F if desired.

Suitable circuits and connections are provided for varying the direction and amount of current in the field I of the booster E to cause the battery D to charge and discharge, and, as shown, the regulating means B controls the field I of the booster.

The regulating means B comprises in this instance any suitable form of constant pull alternating current magnet opposed by a substantially constant force and a suitable resistance or other device is connected to control the booster field I. In this instance the magnet is provided with a laminated iron casing $B'$ for the coil $h'$, and is adapted to receive the core $A'$, one end of which extends beyond the casing and the other end $A^2$ is rounded and terminates inside the casing. Lines of force from $A'$ to $B'$, where $A'$ passes through $B'$ are always horizontal and exert no tractive effort. The lines of force from the rounded end $A^2$ of the core to the similarly curved portion $B^2$ of the casing $B'$ vary in number as the rounded end of the core approaches the rounded portion $B^2$. This variation in number of the lines of force, hence in tractive force is compensated by the variation in direction of the lines due to the curvature of $A'$ and $B'$ in such manner that the component of the pull along the axis of the core $A'$ diminishes inversely as the number of lines increases, and hence the tendency of the core $A'$ to move axially is constant with any given current throughout the range in which such variation of the direction of the lines can be made to compensate for the variation in their quantity. In other words the iron clad solenoid and core are so shaped that for a considerable movement of the core at any given current the increase in the number of lines of force between the end of the core and the rounded part of the casing is compensated by the diminishing component of these lines in an axial direction due to change in their direction. As shown, in this instance, the lever $i$ is pivoted at $j$ and pivotally connected at one end to the core $A'$, and at another portion of its length to a suitable arm $k$ of insulation, provided with the contact points $l$ arranged in stepped formation and adapted to dip into the mercury in the cup $o$. These points as shown are connected to sections of the variable resistance $R$. As shown, mechanical means are provided for opposing a substantially constant force to the action of the magnet in this instance the lever $i$ being provided with an auxiliary arm $p$ extending upwardly at an angle thereto and connected to a spring $q$. As the lever $i$ is rocked on its pivot $j$ the moment of the spring remains substantially constant. Any suitable means may be provided instead of the mercury and contact points for varying the resistance $R$, and any suitable means may be provided in place of the resistance $R$ for controlling the direction and amount of current in the field $I$ of the booster.

Since the magnet coil $h'$ is connected directly in circuit with the variable load on the work circuit and subject to the variations on the work circuit, suitable balancing or compensating means are provided to prevent the core $A'$ from operating through its full range of motion whenever a variation occurs in the work circuit. In this instance, the magnet $M$ is provided, connected in series with the storage battery and energized thereby. The magnet coil $M$, as shown, is provided with a core $i'$ and a field frame $j$. Surrounding the core $i'$ is a floating coil $k'$, the frame $l'$ of which is pivotally connected to the end of the lever $i$. The floating coil $k'$, as shown, is energized from a suitable source of potential, as the exciter $G$ and is connected in circuit therewith by the wires $m$ and $n$, preferably a small stationary or correcting coil $o'$ is connected in circuit, with the floating coil $k'$ and surrounds the core $i'$. This coil $o'$ is so wound as to neutralize the small magnetization set up by the floating coil $k'$, particularly when the large coil $M$ is carrying no current.

In the operation of the regulator $B$, the function of the magnet $M$ is to arrest the motion of the regulator at a point where the battery charge or discharge compensates for the decrease or increase of the load on the line from the normal. In this instance the connections for the booster field are arranged as follows: Let it be assumed that the point 4 is the positive pole of the storage battery and the point 3 is the negative pole. From the point 1 on the storage battery substantially two-thirds of the distance or thereabout from the negative pole 3, a wire 5 leads to and through the field $I$ and thence continues to the point 2. Between the point 3 and the point 2 a wire 6 is connected, including a constant resistance $R'$. From the point 2 the wire 7 continues to and through the variable resistance $R$ and thence back to the point 4 at the positive pole of the battery. It will be seen that the actuating magnet $h'$ of the regulator is placed in the variable circuit, which is highly desirable, and the pull of the magnet will vary approximately as the load varies. A regulator which depends for its action on a precise balance between the pull of the magnet at all loads and the change of booster voltage corresponding thereto would involve great if not insuperable difficulties of construction, and if made could not remain in permanent adjustment. Also a regulator in which the electro-responsive device was opposed by an approximately constant force would travel through too large a range whenever the variable current traversing the electro-responsive device varied from the average at which a balance in the regulator existed. The great advantage of my regulator is that its correctness is not influenced by its position in its range of travel, and it continues to operate with power and precision until the variable current of the work circuit is compensated for by the absorption or discharge of energy from the storage battery, which desirable result is secured by causing the charge or discharge of the battery to produce a push or a pull on a lever $i$. For average current on the work circuit the moment of the spring $j$ is equal to the moment of the magnet core $A'$. As the moment of the spring is constant while the moment of the magnet core varies with the current, the balance is disturbed, which results in a movement of the lever $i$ until, by reason of the battery action, the sum of the moments of the spring $j$ and the floating coil $k'$ is equal to the moment of the actuating magnet core. This is accomplished by having the floating coil traverse by current always in one direction while it is cut by a magnetic flux whose direction and amount varies with the charge and discharge of the battery, therefor the battery discharge produces a pull and the battery charge a repulsion.

In the operation of the apparatus with a normal load on the work circuit $d$ $e$ the parts of the regulating device and the circuits and connections of the apparatus are so adjusted that no current will be flowing through the field $I$ of the booster $E$, because said field is connected between neutral points 1 and 2, which under normal conditions are of the same potential. Let it be assumed that the load on the work circuit $d$ $e$ increase beyond the normal; then the current through the coil $h'$ of the regulating means $B$ will increase and the core $A'$ will be drawn into the magnet against the tension of the spring $q$, thereby raising the point 1 out of the mercury cup $o$ and cutting resistance $R$ into the circuit, which throws the circuits out of balance and the potential of the neutral point 1 is increased over that of the neutral point 2. Current will flow from the point 1 on the storage battery through wire 5, field I and by wire 5 to the point 2, thence through resistance R' and wire 6, back to the negative side of the battery 3. The booster operates to cause the battery to discharge and send current into the direct current side of the rotary converter F, thereby driving said machine as an inverted rotary and causing it to supply alternating current to the system to meet the demand. The discharge of the storage battery D energizes the magnet M which tends to pull down the floating coil $k'$ connected to the lever $i$ and thus a balance is reached between the magnet $h'$ and the combined effect of the magnet M and spring $q$, which enables the regulating means to adjust itself to the demand on the work circuit. When the load on the work circuit $d$ $e$ decreases below the normal, the spring $q$ on the regulating device B comes into action and pulls the contact points 1 into the mercury cup $o$ against the force of the magnet $h'$, thereby cutting resistance R out of the circuit and raising the potential of the neutral point 2 above that of the neutral point 1. Current will then flow from the positive side of the battery at the point 4 through wire 7, resistance R, thence by wire 7 to the point 2, thence by wire 5 to and through field I, and still by wire 5 back to the point 1 on the battery, thus energizing the field I in the opposite direction to that in which it was energized before and the booster will cause the battery to charge. Current will therefore be drawn from the rotary converter which is driven as a rotary from the alternating current line and current is absorbed from the line to meet the demand. Under these conditions the magnet $h'$ has been weakened and the current in the magnet M is in a reverse direction to that in which it was before, so that the floating coil $k'$ will be repelled, thus opposing the action of the spring $q$ and establishing a balance in the regulating device.

In accordance with the construction of the apparatus, circuits and connections described, the regulator or regulating means B is connected to control the charge and discharge of the battery, and said regulator starts to operate when the load on the work circuit tends to vary from the average, and continues to operate until the energy given out by the battery or absorbed thereby compensates for the increase or decrease of energy demanded by the work circuit. The regulating means B described it will be seen, are operated by variations in the current in the work circuit $d$ $e$. The regulating means causes the storage battery to furnish or absorb energy for compensating for variations on the work circuit until the load on the work circuit has been compensated for by the necessary amount of energy which is to be supplied or absorbed by the storage battery. The regulating means causes the battery to absorb energy when the load on the circuit is below the average and causes it to supply energy when the load is above the average substantially irrespective of the position of the parts of the regulating device in their range of travel.

In accordance with this invention the regulator is adapted to move or operate when the load on the source of supply tends to vary from the average and continues to operate or move until the tendency to change is overcome by the action of the battery. My regulating means are substantially balanced and start to operate when the balance is disturbed and continue to operate until the balance is restored.

Fig. 2 shows a modification of the invention in which the rotary converter is caused to compensate for changes in the load by varying the field, while the armature is held in correct phase relation with that of the main generator by other suitable means.

In Fig. 2 the variable resistance R is connected in circuit with the field F of the converter C, and when the load on the work circuit increases beyond the normal the regulating device B removes resistance from the circuit of the field F, thereby strengthening said field and causing the current in the connections $g$ $h$ to lead the voltage. In this modification, the magnet core A' and contact points 1 are both connected on the same side of the fulcrum $j$ so that when core A' is attracted, the points 1 will be dipped into the mercury. In this instance I have provided suitable means embodied in the device S responsive to changes in the power factor of the circuits in which it is connected for varying and controlling the field I of the booster E. In this instance the power factor regulator comprises an iron ring $q$ provided with suitable windings $s$ $s$, one portion of which is connected directly in series with the lead $h$, while the other portion is connected across the leads $g$ and $h$ and is subject to the potential across said leads. Within the ring is provided a suitable squirrel cage or other rotor $t$ adapted to rotate in one direction or the other responsive to rotating magnetic fields. To the rotor $t$ is connected an arm $u$ adapted to raise and lower the contact points $v$ in the mercury cup $w$, and thereby vary the resistance $x$, which is connected by means of the wire 10 to the positive side 4 of the battery and by another wire 10 to the neutral point 2, which point is in turn connected by the wire 11 to the field coil I, also connected by wire 11 to the point 1 on the battery. The neutral point 2 is also connected by means of the wire 12 to the negative pole 3 of the battery, said connections also including the fixed resistance R'. In accordance with this construction when the current and E. M. F. are in phase in connections $g$ $h$ there is no torque in either direction in the device S. If the circuit conditions in connections $g$ $h$ are so changed as to produce a leading current, torque in one direction will be produced, while with a lagging current, torque in the opposite direction will be set up, due to the fact that phase displacement will produce a rotating field. When the load on the work circuit increases beyond the normal, thereby causing regulator B to strengthen the field of converter C, the current in the connections $g$ $h$ will lead the voltage and the device S will move in a direction to draw the contact points $v$ out of the mercury cup $w$, thereby throwing resistance $x$ into the circuits which increases the potential of the neutral point 1 over that of the neutral point 2, thereby causing a current to flow through the field I from the point 1 by wire 11 to point 2 and thence by wire 12 and resistance R' to the negative side 3 of the battery. The booster causes the battery to discharge into the direct current side of the rotary converter, thereby causing said converter to operate as an inverted rotary and supply alternating current to the work circuit to meet the demand. When the load on the work circuit decreases below the normal, the regulating device B cuts resistance into the field F of the rotary C, thereby weakening said field and causing a lagging current in connections $g$ $h$, thereby operating the power factor device S, in a direction to dip the contact points $v$ into the mercury, thereby cutting resistance $x$ out of the circuit and raising the potential of the neutral point 2 above that of the neutral point 1. Current therefore flows from the positive side 4 of the battery by wire 10 through resistance $x$, thence by wire 10 to the neutral point 2, thence by wire 11 through field I back to the point 1 on the battery, thereby causing the battery to charge the booster and draw current from the rotary converter, which takes current from the line to operate as a rotary converter.

With regard to the operation of this apparatus, if the rotary were mechanically connected to the main alternator, increasing the strength of the field would cause it to take the load. As the rotary here shown is a free running machine not mechanically connected to the main alternator, increasing its field strength alone will not cause it to take part of the load unless its armature is held up to correct phase relation by an independent source of power. Its armature will tend to fall slightly behind the armature of the main generator as a result of which the current in the connections $g$ $h$ will lead the voltage. The effect of this leading current flowing through the armature of the rotary will have a demagnetizing tendency on the field so that the rotary will revolve as before with no higher voltage and furnishing no current to the mains. This condition is overcome by means of the power factor device S sensitive to a phase difference between the current and the voltage in the connections $g$ $h$ from the rotary to the mains. As soon as the phase difference occurs this latter device or regulator S increases the voltage of the booster E connected in series with the battery D across the direct current side of the rotary C raising the direct current voltage on the commutator side, and tending to force the armature of the rotary ahead, which action continues until no phase difference exists between the current and voltage in the connections $g$ $h$. When this condition is reached the rotary has the same phase relation to the main generator that it would if mechanically connected thereto. The above changes really only start to take place and are really tendencies to change. As soon as the field of the rotary is strengthened and its armature begins to slip back, the phase sensitive device S causes the armature to forge ahead again and keep in perfect phase relation with the armature of the main generator.

In the embodiment of the invention shown in Fig. 3, a direct current-alternating current set or motor generator U is shown connected in the system, in which U' is the direct current machine and $U^2$ is the alternating current machine, both connected to the same shaft. The resistance R of the regulating means B is connected in circuit with a field $U^3$ of the direct current machine U', and the field $U^4$ of the alternating current machine $U^2$ is energized from a suitable source of constant potential, as the exciter G on the alternator A. When the current on the work circuit tends to increase above the normal, the regulating device B operates to weaken the field $U^3$ of the machine U', thereby reducing the direct current voltage below the battery voltage and causing the battery D to discharge through the connections 20 and 21 connected to the commutator of the machine U'. The machine U' then runs as a motor and alternating current is supplied to the work circuit to meet the demand from the alternating current machine $U^2$. When the load on the work circuit decreases below the normal the regulating device operates to strengthen the field $U^3$ of the machine U', thereby raising the voltage of said machine above that of the battery and causing the battery to charge, in which case the alternating current machine $U^2$ runs as a motor supplied from the work circuit and direct current is supplied to the battery to charge it, thus absorbing current from the work circuit to meet the demand. In the embodiment of the apparatus, the alternating current machine U² runs in synchronism with the line.

In the modification shown in Fig. 4, the circuits and apparatus are substantially like Fig. 3, with the exception that a power factor device S, like that already described, is connected to the leads $g$ and $h$, and connected to control the resistance $x$. This resistance $x$ is connected by a wire 22 with the field U³ of the direct current machine U', and also by wire 22 to the positive side 4 of the battery. The other side of the resistance $x$ is connected by the wire 23 with the negative side 3 of the battery. In this instance the field U⁴ of the alternating current machine U² is connected in circuit with the variable resistance R controlled by the regulating device B by means of the wires 25 and 26. When the current on the work circuit increases beyond the normal the regulating device B operates to strengthen the field U⁴ of the alternating current machine U², thereby causing the current in connections $g$ $h$ to lead and thus disturbing the phase relation of the power factor device S, which throws more of the resistance $x$ into the circuit and weakens the field U³ of the direct current machine U', thereby reducing the voltage of said machine below that of the storage battery, which causes the battery to discharge and supply current to the machine U'. This machine U' then operates as a motor and drives the generator U² which supplies current to meet the demand on the line. When the load on the work circuit decreases below the normal the field U⁴ of the machine U² is weakened, the phase relation in the power factor device S is disturbed, the field U³ of the machine U' is strengthened, and the voltage of the machine U' is increased above that of the battery, thereby charging the battery and causing the machine U² to operate as an alternating current motor which draws current from the line.

In the embodiment of the apparatus shown in Fig. 5, the same system shown in Fig. 3 is illustrated with the addition of a booster E for causing the battery to charge and discharge. In this case both fields U³ and U⁴ of the motor generator are connected to a constant source of potential G. When the load on the work circuit increases beyond the normal the regulating device B operates to cut in more of the resistance R, thereby raising the potential of the point 1 above that of the point 2, and energizing the field I of the booster E in such direction as to cause the battery to discharge and supply current to the direct current machine U', thereby driving said machine as a motor and causing alternating current to be supplied to the line through the leads $g$ and $h$. When the load on the work circuit decreases below the normal the regulating device B operates to cut out the resistance R and send a current through the field I of the booster in such direction as to cause the battery to charge, thereby drawing current from the machine U' which runs as a generator, while the machine U² runs as a motor supplied from the work circuit and draws current from the line.

In the modification shown in Fig. 6 a system substantially like that shown in Fig. 4 is illustrated, utilizing a power factor device S to vary the field I of the booster E causing the battery to charge and discharge. In this instance when the load on the work circuit increases beyond the normal, the regulator B cuts resistance R out of the circuit of the field U⁴ of the machine U², thereby causing the current to lead in the connections $g$ and $h$, which disturbs the phase relation in the power factor device S and said device operates to cut resistance $x$ into circuit, thereby energizing the field I of the booster in such direction as to cause the battery to discharge. The battery supplies current to the direct current machine U', the field of which is energized from a constant source and alternating current is supplied to the line to meet the demand. When the load on the line decreases below the normal the regulating device B weakens the field U⁴ of the machine U₂, thereby disturbing the phase relation of the device S and causing a current to be sent through the field I of the booster in a direction to charge the battery, so that current is drawn from the machine U' which acts as a generator, while the machine U² acts as a motor and draws current from the line.

In the embodiment of the invention shown in Fig. 7 the alternating current machine A is driven from a suitable engine, as by means of the crank A⁵, and on the same shaft is preferably arranged a rotary converter A⁶ provided with the slip rings 30 and the commutator 31. The slip rings 30 are connected as by means of the leads $g$ and $h$ to the work circuit, and the power factor device S is connected to said leads and controls the resistance $x$ for varying the direction and amount of current in the field I of the booster. The regulating device B controls the resistance R, which in turn controls the field A⁷ of the rotary A⁶. When the load on the work circuit increases beyond the normal, the regulating device B cuts resistance out of the circuit of the field A⁷ of the rotary A⁶, thereby strengthening said field and causing the current in the connections $g$, $h$ to lead, which disturbs the phase relation in the power factor device S and causes said device to cut resistance $x$ into circuit, thereby energizing the field I of the booster in a direction to cause the battery to discharge. Current is therefore supplied from the battery to the direct current side of the rotary $A^6$ and the machine acts as an inverted rotary to supply additional alternating current to the line by the leads $g$ and $h$. On the other hand when the load on the work circuit decreases below the normal the regulating device B cuts resistance R into the circuit of the field $A^7$ of the rotary $A^6$, thereby weakening said field and altering the phase relation in the power factor device S which operates to cut resistance $x$ out of circuit, thereby energizing the field I of the booster in a direction to charge the battery. Current is therefore drawn from the rotary converter $A^6$ and current is drawn from the line through the leads $g$ and $h$ to meet the demand.

In the embodiment of the invention shown in Fig. 8 the circuits and apparatus are substantially like that shown in Fig. 7, with the exception that the power factor device S is omitted and instead of a rotary converter on the engine shaft a direct current machine is placed on said shaft having a commutator 30 in series with which the storage battery, booster and magnet M are connected. The field 31 of the direct current machine 32 is suitably energized, as, for instance, by the exciter G. In accordance with this construction when the load on the work circuit increases beyond the normal the regulator B causes the battery to discharge and current is supplied to the direct current machine 32 to drive it as a motor and assist the engine. On the other hand when the load on the work circuit decreases below the normal the regulator B causes the battery to charge and current is drawn from the machine 32 which then acts as a generator driven by the engine, and energy is stored up in the storage battery for use when the load on the work circuit increases above the average.

In Fig. 9 the arrangement is substantially like Fig. 8, except that no booster is used. In this instance the field F of the direct current machine 32 is connected in circuit with the variable resistance R of the regulating device B by means of the wires 25 and 26, and when the load on the work circuit increases above the normal resistance R is cut into the circuit of the field F, thereby weakening said field and reducing the voltage of the machine 32 below that of the battery which permits the battery to discharge and drive the machine 32 as a motor to assist the engine. On the other hand when the load on the work circuit decreases below the normal the field F of the machine 32 is strengthened, thereby raising its voltage above that of the battery and charging the battery, thus storing energy for use when the load again increases beyond a predetermined amount.

In Fig. 10 the main generator A is shown provided with a commutator 40 connected to its armature coils and the storage battery D and booster E are connected in series with the commutator 40 and the magnet M. The resistance R is connected to control the direction and amount of current of the field I of the booster as heretofore described. When the load on the work circuit increases beyond the normal the field I of the booster is energized in the proper direction to cause the battery D to discharge and current is supplied to the commutator 40 and is converted into alternating current and supplied from the slip rings 41 to the mains $b$ $c$. In this instance, the main generator A is acting both as an alternating current generator and as a rotary transformer. When the load on the work circuit decreases below the normal the field I of the booster E is energized in a direction to cause the battery D to charge and current is taken from the machine A through the commutator 40 and therefore current is absorbed from the line.

Obviously some features of this invention may be used without others and the invention may be embodied in widely varying forms, therefore, without limiting the invention to the devices shown and described, and without enumerating equivalents,

I claim and desire to obtain by Letters Patent the following:

The combination of an alternating current source of supply, an alternating current work circuit, a storage battery to compensate for variations in the load, regulating means responsive to both the variations in the work circuit and the direction and amount of current of the storage battery, and operated by variations in the work circuit, said regulating means starting to operate when the load on the work circuit varies from the average, and continuing to operate until the energy given out by the battery or absorbed thereby compensates for the increase or decrease of energy demanded by the work circuit.

In testimony whereof I have signed this specification in the presence of two subscribing witnesses.

JOSEPH BIJUR.

Witnesses:
LEO J. MATTY,
OLIN A. FOSTER.